United States Patent
Eng et al.

(10) Patent No.: US 12,003,981 B2
(45) Date of Patent: *Jun. 4, 2024

(54) PARAMETERIZED RADIO WAVEFORM TECHNIQUES FOR OPERATING IN MULTIPLE WIRELESS ENVIRONMENTS

(71) Applicant: Coherent Logix, Incorporated, Austin, TX (US)

(72) Inventors: Tommy K. Eng, San Jose, CA (US); Kevin A. Shelby, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,456

(22) Filed: May 30, 2023

(65) Prior Publication Data

US 2023/0362682 A1    Nov. 9, 2023

Related U.S. Application Data

(63) Continuation of application No. 17/517,155, filed on Nov. 2, 2021, now Pat. No. 11,706,641, which is a
(Continued)

(51) Int. Cl.
*H04W 24/02*    (2009.01)
*H04L 5/00*    (2006.01)
(Continued)

(52) U.S. Cl.
CPC .......... *H04W 24/02* (2013.01); *H04L 5/0028* (2013.01); *H04L 5/0064* (2013.01);
(Continued)

(58) Field of Classification Search
CPC ..... H04W 24/02; H04W 88/10; H04W 28/18; H04L 5/0064; H04L 27/0008; H04L 5/0069; H04L 5/0028
See application file for complete search history.

(56) References Cited

U.S. PATENT DOCUMENTS

| | | | |
|---|---|---|---|
| 8,687,617 B2 | 4/2014 | Agrawal | |
| 2004/0081131 A1* | 4/2004 | Walton | H04B 7/0854 370/344 |

(Continued)

FOREIGN PATENT DOCUMENTS

| | | |
|---|---|---|
| CA | 2 569 457 A1 | 12/2005 |
| CN | 1993955 A | 7/2007 |

(Continued)

OTHER PUBLICATIONS

"Reconfigurable Radio Systems (RRS); Use Cases for Reconfigurable Radio Systems Operating in IMT Bands and GSM Bands for Intra-Operator Scenarios"; Technical Report, European Telecommunications Standards Institute (ETSI); 650 Route Des Lucioles, F-06921 Sophia-Antipolis, France; vol. RRS 1, No. V1.1.1; Jul. 1, 2011; XP014065616 (36 pages).

(Continued)

*Primary Examiner* — Lakeram Jangbahadur
(74) *Attorney, Agent, or Firm* — Kowert, Hood, Munyon, Rankin & Goetzel, P.C.; Jeffrey C. Hood

(57) ABSTRACT

Techniques for operating a wireless network in a plurality of radio operating environments are disclosed. In some embodiments, an apparatus receives a first parameter value set that is selected from a group of multiple parameter value sets, wherein the first parameter value set is appropriate for a first target radio operating environment that corresponds to one or more of: a first level of mobility of user devices or a first range of wireless transmission. In some embodiments, the apparatus is reconfigured to receive wireless broadcast transmissions from a second broadcast transmitter using a second parameter value set that is appropriate for a second target radio operating environment. The first and second broadcast transmitters may be the same or different. The parameter value sets may include a first parameter based upon which the apparatus is configured to determine sub- (Continued)

carrier spacing and a second parameter that indicates a cyclic prefix size.

20 Claims, 9 Drawing Sheets

Related U.S. Application Data continuation of application No. 16/790,936, filed on Feb. 14, 2020, now Pat. No. 11,172,383, which is a continuation of application No. 16/268,749, filed on Feb. 6, 2019, now Pat. No. 10,567,981, which is a continuation of application No. 15/887,360, filed on Feb. 2, 2018, now Pat. No. 10,206,126, which is a continuation of application No. 15/659,899, filed on Jul. 26, 2017, now Pat. No. 9,913,153, which is a continuation of application No. 14/463,125, filed on Aug. 19, 2014, now Pat. No. 9,749,879.

(60) Provisional application No. 61/867,434, filed on Aug. 19, 2013.

(51) Int. Cl.
    *H04L 27/00* (2006.01)
    *H04W 28/18* (2009.01)
    *H04W 88/10* (2009.01)

(52) U.S. Cl.
    CPC ........ *H04L 5/0069* (2013.01); *H04L 27/0008* (2013.01); *H04W 28/18* (2013.01); *H04W 88/10* (2013.01)

(56) References Cited

U.S. PATENT DOCUMENTS

| | | |
|---|---|---|
| 2007/0274252 A1 | 11/2007 | Zhang et al. |
| 2008/0240275 A1 | 10/2008 | Cai |
| 2009/0122771 A1 | 5/2009 | Cai |
| 2009/0185632 A1* | 7/2009 | Cai ...................... H04L 5/0044 |
| | | 375/260 |
| 2009/0262692 A1 | 10/2009 | Olszewski |
| 2010/0130187 A1* | 5/2010 | Yu ............................ G06F 8/65 |
| | | 455/418 |
| 2011/0032850 A1 | 2/2011 | Cai |
| 2011/0105101 A1 | 5/2011 | Earnshaw |

FOREIGN PATENT DOCUMENTS

| | | |
|---|---|---|
| CN | 101136894 A | 3/2008 |
| CN | 101166172 A | 4/2008 |
| CN | 101232658 A | 7/2008 |
| CN | 101346959 A | 1/2009 |
| CN | 101400082 A | 4/2009 |
| CN | 101425874 A | 5/2009 |
| CN | 101689921 A | 3/2010 |
| CN | 101779430 A | 7/2010 |
| CN | 101855880 A | 10/2010 |
| EP | 1 947 872 A1 | 7/2008 |
| JP | 2011502386 | 1/2011 |
| JP | 2011504018 | 1/2011 |
| JP | 2011071731 | 4/2011 |

OTHER PUBLICATIONS

Office Action, Chinese Application for Invention No. 201480052516.9, dated Jun. 4, 2018, 29 pages.
Office Action for Japanese Patent Application No. 2019-186738, with translation, dated Feb. 2, 2021, 15 pgs.
ETSI (Reconfigurable Radio Systems—ETSI TR 103 063 V1.1.1).

* cited by examiner

| Control Panel | | | Comments | Symbols per SF |
|---|---|---|---|---|
| Signal Bandwidth | | | | |
| $B_{chan}$ | 6 | MHz | Nominal channel | |
| $B_{sig}$ | 5.58 | MHz | Occupied signal | |
| fs | 9.216 | MS/s | Sampling Rate | |
| NRBs | 31 | | Number of RBs; nearest integer within signal BW | |
| Signal Duration | | | | |
| sf | 1 | ms | Subframe | |
| F | 10 | ms | Frame | |
| SF | 40 | ms | SuperFrame | |
| Misc. | | | | |
| MAX CP% | 50% | | Render any configuration null (-) that exceeds MAX CP% | |
| $N_{SC\_RB}$ | 12 | | Number of subcarriers per RB (per symbol period) | |
| $\Delta f$ | 15 | kHz | Nominal subcarrier spacing | |
| RB_BW | 180 | kHz | Nominal Resource Block bandwidth | |

FIG. 2
(Table 1)

| Control Panel | | | | | | | | | | | | | |
|---|---|---|---|---|---|---|---|---|---|---|---|---|---|
| Signal Bandwidth | | | | | | | | | | | | | |
| $B_{chan}$ | 6 | MHz | | | | | | | | | | | |
| $B_{sig}$ | 5.58 | MHz | | | | | | | | | | | |
| $f_s$ | 9.216 | MS/s | | | | | | | | | | | |
| NRBs | 31 | | | | | | | | | | | | |
| Signal Duration | | | | | | | | | | | | | |
| $sf$ | 1 | ms | | | | | | | | | | | |
| F | 10 | ms | | | | | | | | | | | |
| SF | 40 | ms | | | | | | | | | | | |
| Misc. | | | | | | | | | | | | | |
| MAX CP% | 50% | | | | | | | | | | | | |
| $N_{SC\_RB}$ | 12 | | | | | | | | | | | | |
| $\Delta f$ | 15 | kHz | | | | | | | | | | | |
| RB_BW | 180 | kHz | | | | | | | | | | | |

| | | FFT Dimension | | | | | | Max. Doppler | | | $N_{SYM}$ | | | |
|---|---|---|---|---|---|---|---|---|---|---|---|---|---|---|
| | $5^n$ | $3^n$ | $2^p$ | p | NFFT | TFFT µs | $\Delta f$ kHz | kph | mph | | | | | |
| | m | n | p | | | | | | | | | | | |
| | 0 | 1 | 10 | 10 | 3072 | 333.3 | 3 | 540 | 336 | 119.53 | 119.07 | 118.61 | 119.07 | 118.00 |
| | 1 | 0 | 8 | 8 | 3840 | 416.7 | 2.4 | 432 | 268 | 95.63 | 95.26 | 94.89 | 95.26 | 94.40 |
| | 0 | 0 | 12 | 12 | 4096 | 444.4 | 2.25 | 405 | 252 | 89.65 | 89.30 | 88.96 | 89.30 | 88.50 |
| | 1 | 0 | 10 | 10 | 5120 | 555.6 | 1.8 | 324 | 201 | 71.72 | 71.44 | 71.17 | 71.44 | 70.80 |
| | 1 | 2 | 7 | 7 | 5760 | 625 | 1.6 | 288 | 179 | 63.75 | 63.50 | 63.26 | 63.50 | 62.93 |
| | 0 | 1 | 11 | 11 | 6144 | 666.7 | 1.5 | 270 | 168 | 59.77 | 59.53 | 59.31 | 59.53 | 59.00 |
| | 1 | 1 | 9 | 9 | 7680 | 833.3 | 1.2 | 216 | 134 | 47.81 | 47.63 | 47.44 | 47.63 | 47.20 |
| | 0 | 0 | 13 | 13 | 8192 | 888.9 | 1.125 | 203 | 126 | 44.82 | 44.65 | 44.48 | 44.65 | 44.25 |
| | 1 | 0 | 11 | 11 | 10240 | 1111 | 0.9 | 162 | 101 | 35.86 | 35.72 | 35.58 | 35.72 | 35.40 |
| | 0 | 2 | 8 | 8 | 11520 | 1250 | 0.8 | 135 | 89 | 31.88 | 31.75 | 31.63 | 31.75 | 31.47 |
| | 1 | 0 | 12 | 12 | 12288 | 1333 | 0.75 | 108 | 67 | 29.88 | 29.77 | 29.65 | 29.77 | 29.50 |
| | 1 | 1 | 10 | 10 | 15360 | 1667 | 0.6 | 101 | 63 | 23.91 | 23.81 | 23.72 | 23.81 | 23.60 |
| | 0 | 0 | 14 | 14 | 16384 | 1778 | 0.563 | 81 | 50 | 22.41 | 22.33 | 22.24 | 22.33 | 22.13 |
| | 1 | 0 | 12 | 12 | 20480 | 2222 | 0.45 | 72 | 45 | 17.93 | 17.86 | 17.79 | 17.86 | 17.20 |
| | 0 | 2 | 9 | 9 | 23040 | 2500 | 0.4 | 68 | 42 | 15.94 | 15.88 | 15.81 | 15.88 | 15.73 |
| | 1 | 1 | 13 | 13 | 24576 | 2667 | 0.375 | 54 | 34 | 14.94 | 14.88 | 14.83 | 14.88 | 14.75 |
| | 1 | 0 | 11 | 11 | 30720 | 3333 | 0.3 | 51 | 32 | 11.95 | 11.91 | 11.86 | 11.91 | 11.80 |
| | 0 | 0 | 15 | 15 | 32768 | 3556 | 0.281 | 41 | 25 | 11.21 | 11.16 | 11.12 | 11.16 | 11.06 |
| | 1 | 2 | 13 | 13 | 40960 | 4444 | 0.225 | 36 | 22 | 8.96 | 8.93 | 8.90 | 8.93 | 8.85 |
| | 1 | 1 | 10 | 10 | 46080 | 5000 | 0.2 | 34 | 21 | 7.97 | 7.94 | 7.91 | 7.94 | 7.87 |
| | 0 | 1 | 14 | 14 | 49152 | 5333 | 0.188 | 27 | 17 | 7.47 | 7.44 | 7.41 | 7.44 | 7.38 |
| | 1 | 1 | 12 | 12 | 61440 | 6667 | 0.15 | 27 | 16 | 5.98 | 5.95 | 5.93 | 5.95 | 5.90 |
| | 0 | 0 | 16 | 16 | 65536 | 7111 | 0.141 | | | 5.60 | 5.58 | 5.56 | 5.58 | 5.53 |
| | | | | | | | | | CP% | 0.39% | 0.78% | 1.17% | 0.78% | 1.69% |

| Operators Panel | | | |
|---|---|---|---|
| R | 50 | km | |
| fc | 600 | MHz | |
| v | 100 | kph |
| | 62 | mph |
| mod | 256-QAM | | |
| | 8 | bits | |
| k/n | 0.833 | | |
| ovr | 10% | | |
| NFFT | 16384 | | |
| TSYM | 2000.00 | | |
| | 8.19 | bps/Hz | |

FIG. 3 (Table 2)

FIG. 4
(Table 3)

| Operators Panel | | | |
|---|---|---|---|
| R | 50 | km | Range target |
| fc | 600 | MHz | Carrier frequency |
| v | 100 | khp | Maximum velocity |
| | 62 | mph | |
| mod | 256-QAM | | modulation scheme |
| | 8 | bits | |
| k/n | 0.833 | | Coding rate |
| ovr | 10% | | Signaling overhead |
| $N_{FFT}$ | 16384 | | Selected FFT dimension |
| $T_{SYM}$ | 2000.00 | | Corresponding to selected CP% |
| | 8.19 | bps/Hz | Spectral efficiency |

FIG. 5 (Table 4)

| Control Panel | | | | | | | | | | | | | |
|---|---|---|---|---|---|---|---|---|---|---|---|---|---|
| Signal Bandwidth | | | | | | | | | | | | | |
| $B_{chan}$ | 6 | | | | | | | | | | | | |
| $B_{sig}$ | 5.58 | | | | | | | | | | | | |
| $f_s$ | 9.216 | | FFT Dimension | | | | | | | | | | |
| $NRBs$ | 31 | | $5^m$ | $3^n$ | $2^p$ | | | | | | | | |
| | | | $m$ | $n$ | $p$ | $NFFT$ | $TFFT$ μs | $\Delta f$ kHz | Max. Doppler kph | Max. Doppler mph | | Coverage (km) | |
| Signal Duration | | | | | | | | | | | | | |
| $sf$ | 1 | | 0 | 1 | 10 | 3072 | 333.3 | 3 | 540 | 336 | 0.00 | 1.00 | 2.00 |
| $F$ | 10 | | 1 | 0 | 8 | 3840 | 416.7 | 2.4 | 432 | 268 | 0.00 | 1.00 | 2.00 |
| $SF$ | 40 | | 0 | 0 | 12 | 4096 | 444.4 | 2.25 | 405 | 252 | 1.00 | 1.00 | 2.00 |
| Misc. | | | | | | | | | | | | | |
| $MAX\ CP\%$ | 50% | | 1 | 2 | 10 | 5120 | 555.6 | 1.8 | 324 | 201 | 1.00 | 2.00 | 3.00 |
| $N_{SC\_RB}$ | 12 | | 0 | 0 | 7 | 5760 | 625 | 1.6 | 288 | 179 | 1.00 | 2.00 | 3.00 |
| $\Delta f$ | 15 | | 1 | 2 | 11 | 6144 | 666.7 | 1.5 | 270 | 168 | 1.00 | 2.00 | 3.00 |
| $RB\_BW$ | 180 | | 0 | 1 | 9 | 7680 | 833.3 | 1.2 | 216 | 134 | 1.00 | 3.00 | 4.00 |
| | | | 0 | 0 | 13 | 8192 | 888.9 | 1.125 | 203 | 126 | 1.00 | 3.00 | 5.00 |
| | | | 1 | 0 | 11 | 10240 | 1111 | 0.9 | 162 | 101 | 1.00 | 4.00 | 6.00 |
| | | | 1 | 2 | 8 | 11520 | 1250 | 0.8 | 144 | 89 | 1.00 | 3.00 | 6.00 |
| | | | 0 | 1 | 12 | 12288 | 1333 | 0.75 | 135 | 84 | 2.00 | 5.00 | 7.00 |
| | | | 1 | 1 | 10 | 15360 | 1667 | 0.6 | 108 | 67 | 2.00 | 6.00 | 8.00 |
| Operators Panel | | | | | | | | | | | | | |
| $R$ | 50 | | 0 | 0 | 14 | 16384 | 1778 | 0.563 | 101 | 63 | 3.00 | 6.00 | 9.00 |
| $fc$ | 600 | | 1 | 2 | 12 | 20480 | 2222 | 0.45 | 81 | 50 | 3.00 | 8.00 | 11.00 |
| $v$ | 100 | | 1 | 0 | 9 | 23040 | 2500 | 0.4 | 72 | 45 | 3.00 | 9.00 | 13.00 |
| | 62 | | 0 | 2 | 13 | 24576 | 2667 | 0.375 | 68 | 42 | 3.00 | 9.00 | 14.00 |
| $mod$ | 256-QAM | | 1 | 1 | 11 | 30720 | 3333 | 0.3 | 54 | 34 | 4.00 | 12.00 | 17.00 |
| | 8 | | 0 | 0 | 15 | 32768 | 3556 | 0.281 | 51 | 32 | 4.00 | 13.00 | 18.00 |
| $k/n$ | 0.833 | | 1 | 0 | 13 | 40960 | 4444 | 0.225 | 41 | 25 | 5.00 | 10.00 | 23.00 |
| $ovr$ | 10% | | 1 | 2 | 10 | 46080 | 5000 | 0.2 | 36 | 22 | 6.00 | 12.00 | 25.00 |
| $NFFT$ | 16384 | | 0 | 1 | 14 | 49152 | 5333 | 0.188 | 34 | 21 | 6.00 | 13.00 | 27.00 |
| $TSYM$ | 2000.00 | | 1 | 1 | 12 | 61440 | 6667 | 0.15 | 27 | 17 | 8.00 | 16.00 | 34.00 |
| | 8.19 | | 0 | 0 | 16 | 65536 | 7111 | 0.141 | 25 | 16 | 8.00 | 17.00 | 36.00 |
| | | | | | | | | | | CP% | 0.39% | 0.78% | 1.69% |
| | | | | | | | | | | | | 1.17% | |
| | | | | | | | | | | | | 0.78% | |

| Control Panel | | | | | | | | Comments | | | |
|---|---|---|---|---|---|---|---|---|---|---|---|
| Signal Bandwidth | | | NFFT | TFFT | Δf | | | $T_{SYM}=GI+T_{FFT}$ | | | |
| $B_{chan}$ | 6 | MHz | | μs | kHz | kph | mph | | | | 312.50 |
| $B_{sig}$ | 5.58 | MHz | 2560 | 277.8 | 3.6 | 648 | 403 | 308.64 | - | | 375.00 |
| fs | 9.216 | MS/s | 3072 | 333.3 | 3 | 540 | 336 | 370.37 | - | | 468.75 |
| NRBs | 31 | | 3840 | 416.7 | 2.4 | 432 | 268 | 462.96 | - | | 500.00 |
| Signal Duration | | | 4096 | 444.4 | 2.25 | 405 | 252 | 493.83 | - | | 625.00 |
| sf | 1 | ms | 5120 | 555.6 | 1.8 | 324 | 201 | 617.28 | - | | 703.13 |
| F | 10 | ms | 5760 | 625 | 1.6 | 288 | 179 | 694.44 | - | | 750.00 |
| SF | 40 | ms | 6144 | 666.7 | 1.5 | 270 | 168 | 740.74 | - | | 937.50 |
| Misc. | | | 7680 | 833.3 | 1.2 | 216 | 134 | 925.93 | - | | 1000.00 |
| MAX CP% | 50% | | 8192 | 888.9 | 1.125 | 203 | 126 | 987.65 | - | | 1250.00 |
| $N_{SC\_RB}$ | 12 | | 10240 | 1111 | 0.9 | 162 | 101 | 1234.57 | - | | 1406.00 |
| Δf | 15 | kHz | 11520 | 1250 | 0.8 | 144 | 89 | 1388.89 | - | | 1500.00 |
| RB_BW | 180 | kHz | 12288 | 1333 | 0.75 | 135 | 84 | 1481.48 | - | | 1875.00 |
| | | | 15360 | 1667 | 0.6 | 108 | 67 | 1851.85 | - | | 2000.00 |
| Operators Panel | | | 16384 | 1778 | 0.563 | 101 | 63 | 1975.31 | - | | 2500.00 |
| R | 50 | km | 20480 | 2222 | 0.45 | - | - | 2469.14 | - | | 2812.50 |
| fc | 600 | MHz | 23040 | 2500 | 0.4 | - | - | 2777.78 | - | | 3000.00 |
| v | 100 | khp | 24576 | 2667 | 0.375 | - | - | 2962.96 | - | | 3750.00 |
| | 62 | mph | 30720 | 3333 | 0.3 | - | - | 3703.70 | - | | 4000.00 |
| mod | 256-QAM | | 32768 | 3556 | 0.281 | - | - | 3950.62 | - | | 5000.00 |
| bits/sym | 8 | bits | 40960 | 4444 | 0.225 | - | - | 4938.27 | - | | 5625.00 |
| k/n | 0.833 | | 46080 | 5000 | 0.2 | - | - | 5555.56 | - | | 6000.00 |
| ovr | 10% | | 49152 | 5333 | 0.188 | - | - | 5925.93 | - | | 7500.00 |
| NFFT | 16384 | | 61440 | 6667 | 0.15 | - | - | 7407.41 | - | | 8000.00 |
| TSYM | 2000.00 | | 65536 | 7111 | 0.141 | - | - | 7901.23 | - | | 12.50% |
| | 8.19 | bps/Hz | | | | | | CP% | 11.11% | | |

FIG. 6 (Table 5)

PARAMETERIZED RADIO WAVEFORM TECHNIQUES FOR OPERATING IN MULTIPLE WIRELESS ENVIRONMENTS

PRIORITY CLAIM INFORMATION

This application is a continuation of U.S. patent application Ser. No. 17/517,155, filed Nov. 2, 2021, which is a continuation of U.S. patent application Ser. No. 16/790,936, filed Feb. 14, 2020, now U.S. Pat. No. 11,172,383, which is a continuation of U.S. patent application Ser. No. 16/268,749, filed Feb. 6, 2019, now U.S. Pat. No. 10,567,981, which is a continuation of U.S. patent application Ser. No. 15/887,360, filed Feb. 2, 2018, now U.S. Pat. No. 10,206,126, which is a continuation of U.S. patent application Ser. No. 15/659,899, filed Jul. 26, 2017, now U.S. Pat. No. 9,913,153, which is a continuation of U.S. patent application Ser. No. 14/463,125, filed Aug. 19, 2014, now U.S. Pat. No. 9,749,879, which claims benefit of priority to U.S. Provisional Application Ser. No. 61/867,434, filed Aug. 19, 2013; the disclosures of each of which are hereby incorporated by reference in their respective entireties as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present invention relates to the field of wireless communication, and more particularly, to mechanisms for adapting a transmitted waveform for different radio operating environments.

DESCRIPTION OF THE RELATED ART

In conventional wireless radio standards, especially broadcast radio, a set of communication parameters is predetermined for operation in a given radio operating environment, resulting in non-optimal performance when the radio operating environment varies widely. For example, a broadcast transmitter serving predominantly mobile receivers faces different operating challenges than one serving fixed receivers. As another example, a broadcast transmitter operating in a dense urban setting faces different challenges than one operating in rural environment. As yet another example, OFDM waveform parameters optimized for the low latency and relatively small coverage requirement of a wireless broadband network (e.g., LTE) is not optimal for the OFDM waveform used in broadcast, where the coverage requirement can be significantly greater than that of a wireless broadband network. Thus, there exists a need for mechanisms capable of adapting the radio waveform so that a different set of waveform parameters may be used for a different operating environment.

SUMMARY OF THE EMBODIMENTS

In one set of embodiments, a method for operating a wireless network in a plurality of radio operating environments may involve the following operations.

The method may include selecting a first parameter value set from a library of two or more parameter value sets, wherein each of the parameter value sets includes a value for each of one or more communication-related parameters, wherein the first parameter value set is appropriate for a first target radio operating environment, wherein said selecting the first parameter value set is performed for a first set of one or more infrastructure radios that are to be operated in the first target radio operating environment.

In some embodiments, at least one of the two or more parameter value sets in the library may be optimized for communication with mobile devices (e.g., handsets, tablets, radios in cars, etc). For example, such a parameter value set may include a larger value of subcarrier spacing than would be used for fixed devices. Furthermore, at least one of the two or more parameter value sets in the library may be optimized for communication with fixed devices (e.g., wireless access radios in homes, televisions, etc.). The scope of meaning of the term "communication" is to be interpreted broadly as including unicast (e.g., as in LTE, WiFi and so on), multicast, broadcast, and any combination of the foregoing.

The method may include applying the first parameter value set to the first set of one or more infrastructure radios so that the first set of one or more infrastructure radios will start using the first parameter value set to wirelessly communicate with user devices.

The selecting operation and the applying operation may be performed by a configuration controller of the wireless network.

In some embodiments, the method may also include generating a list of possible values for each of the one or more communication-related parameters. In these embodiments, the action of selecting the first parameter value set includes selecting a value from each of the one or more lists so that the combination of the selected values satisfies one or more of the following constraints: the combination yields an integer number of OFDM symbols per superframe; the combination satisfies an operator-specified constraint on mobility;

the combination satisfies an operator-specified constraint on range. The combination of selected values may maximize throughput subject to the one or more constraints.

In one set of embodiments, an infrastructure radio in a wireless network may be configured as follows.

The infrastructure radio may include circuitry configured to receive first information from a configuration controller of the wireless network, wherein the first information identifies a first parameter value set from a library of two or more parameter value sets, wherein each of the parameter value sets includes a value for each of one or more communication-related parameters, wherein the first parameter value set is appropriate for a first target radio operating environment.

The circuitry may be further configured to: reconfigure the infrastructure radio to wirelessly communicate with user devices using the first parameter value set; and transmit the first parameter value set or first information identifying the first parameter value set to the user devices so that the user devices may reconfigure themselves to communicate wirelessly with the infrastructure radio using the first parameter value set.

In one set of embodiments, a user device for communication with a wireless network may be configured as follows.

The user device may include circuitry configured to receive first information from an infrastructure radio of the wireless network, wherein the first information identifies a first parameter value set from a library of two or more parameter value sets, wherein each of the parameter value sets includes a value for each of one or more communication-related parameters, wherein the first parameter value set is appropriate for a first target radio operating environment.

The circuitry may be further configured to reconfigure the user device to wirelessly communicate with the infrastructure radio using the first parameter value set.

In one set of embodiments, a computer-implemented method for designing a library of two or more parameter value sets for a wireless network may be performed as follows. Each of the parameter value sets includes a value for each of one or more communication-related parameters.

The method may include selecting the two or more parameter value sets defining the library from a global space of possible parameter value sets based on one or more criteria. The one or more communication-related parameters include one or more of the following: a number of symbols per superframe; channel bandwidth; occupied bandwidth; sampling rate; number of resource blocks; subframe duration; frame duration;

superframe duration; number of subcarriers per resource block per symbol period; nominal subcarrier spacing; nominal resource block bandwidth; FFT size; cyclic prefix size or cyclic prefix percentage; target range; carrier center frequency; user mobility requirement; modulation scheme; coding rate; signaling overhead.

In one set of embodiments, a computer-implemented method for designing a library of two or more parameter value sets for a wireless network may performed as follows. Each of the parameter value sets may include a value for each of one or more communication-related parameters.

The method may include selecting the two or more parameter value sets defining the library from a global space of possible parameter value sets based on one or more criteria. The one or more communication-related parameters may include one or more of the following: a number of symbols per superframe; channel bandwidth; occupied bandwidth; sampling rate; number of resource blocks; subframe duration; frame duration;

superframe duration; number of subcarriers per resource block per symbol period;

nominal subcarrier spacing; nominal resource block bandwidth; FFT size; cyclic prefix size or cyclic prefix percentage; target range; carrier center frequency; user mobility requirement; modulation scheme; coding rate; signaling overhead.

The method may also include applying a particular one of the two or more parameter value sets to a set of one or more infrastructure radios so that the set of one or more infrastructure radios will start using the particular parameter value set to wirelessly communicate with user devices.

BRIEF DESCRIPTION OF THE DRAWINGS

FIG. 2 (i.e., Table 1) illustrates one embodiment of a control panel used to select appropriate parameter values to satisfy a set of operating constraints for a set of infrastructure radios.

FIG. 3 (i.e., Table 2) shows one embodiment of a system configuration worksheet, which is used to set up a system of one or more radios for communication in a targeted radio operating environment.

FIG. 4 (i.e., Table 3) shows one embodiment of an operator's panel allowing an operator to specify range and mobility requirements.

FIG. 5 (i.e., Table 4) shows one embodiment of the system configuration worksheet where coverage (cell range) for various combinations of FFT size and cyclic prefix percentage is displayed.

FIG. 6 (i.e., Table 5) shows one embodiment of the system configuration worksheet, where symbol duration $T_{SYM}$ is displayed for various combinations of FFT size and cyclic prefix percentage.

Figure 1A:
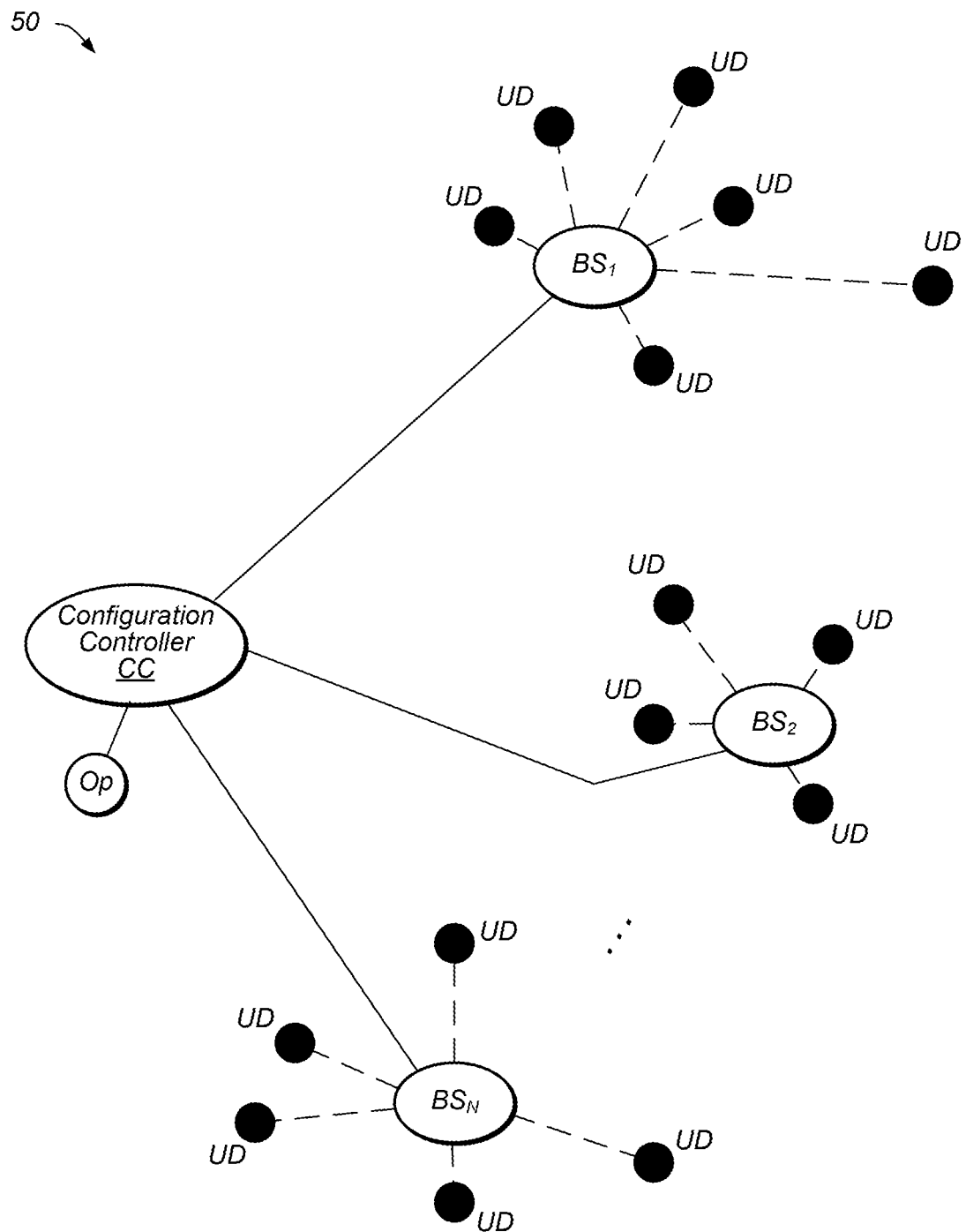
FIG. 1A illustrates one embodiment of a wireless network including a plurality of base stations.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporations by Reference

The following Patent Applications are hereby incorporated by reference as though fully and completely set forth herein:

U.S. Provisional Application No. 61/867,434, filed Aug. 19, 2013, titled "Parameterized Radio Waveform for Operating in Multiple Wireless Environments", invented by Tommy K. Eng and Kevin A. Shelby;

U.S. patent application Ser. No. 12/167,708 (now U.S. Pat. No. 8,151,305), filed Jul. 3, 2008, entitled "MOBILE TELEVISION BROADCAST SYSTEM", invented by Doerr et al., which discloses mechanisms allowing a communication system to be dynamically modified; and U.S. patent application Ser. No. 12/479,423 (now U.S. Pat. No. 8,489,762), filed Jun. 5, 2009, entitled "TRANSMITTING AND RECEIVING CONTROL INFORMATION FOR USE WITH MULTIMEDIA STREAMS", invented by McGinn et al., which discloses a tree based structure to enable a receive device to manage the addition of system parameters or methods in future protocol versions applied across layers of a protocol stack.

Terminology Used in the Present Patent

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Computer System—any of various types of computing or processing systems, including a personal computer system (PC), mainframe computer system, workstation, network appliance, internet appliance, personal digital assistant (PDA), grid computing system, cloud server or other device or combinations of devices. In general, the term "computer system" can be broadly defined to encompass any device (or combination of devices) having at least one processor that executes instructions from a memory medium.

User Equipment (UE) (or "UE Device")— any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Wireless Network Architecture

In one set of embodiments, a wireless network 50 may be configured as shown in FIG. 1A. The wireless network may include one or more base stations illustratively suggested by base stations BS1, BS2, . . . , BSN. A configuration controller CC, centralized or distributed, may couple to the base stations through any of a variety of communication media. For example, in one embodiment, the communication controller may couple to the base stations via the Internet, or more generally, via a computer network. Each base station wirelessly transmits information to one or more user devices. (Each user device UD is denoted by a solid block circle.) Some of the user devices may be fixed devices such as televisions, wireless equipment installed at home or office, set-top boxes, and desktop computers. Other ones of the user devices may be mobile devices such as mobile phones, tablets, laptop computers, mobile TV receivers, automobile-based devices, aircraft-based devices, etc. An operator Op of the wireless network may access the configuration controller CC (e.g., via the Internet), and provide inputs specifying radio operating parameters and/or operational requirements for one or more of the base stations. The configuration controller allows the operator to select a parameter value set consistent with the specified radio operating parameters and/or operational requirements, and to apply the selected parameter value set to the one or more base stations.

OFDM System Configuration

Figure 1B:
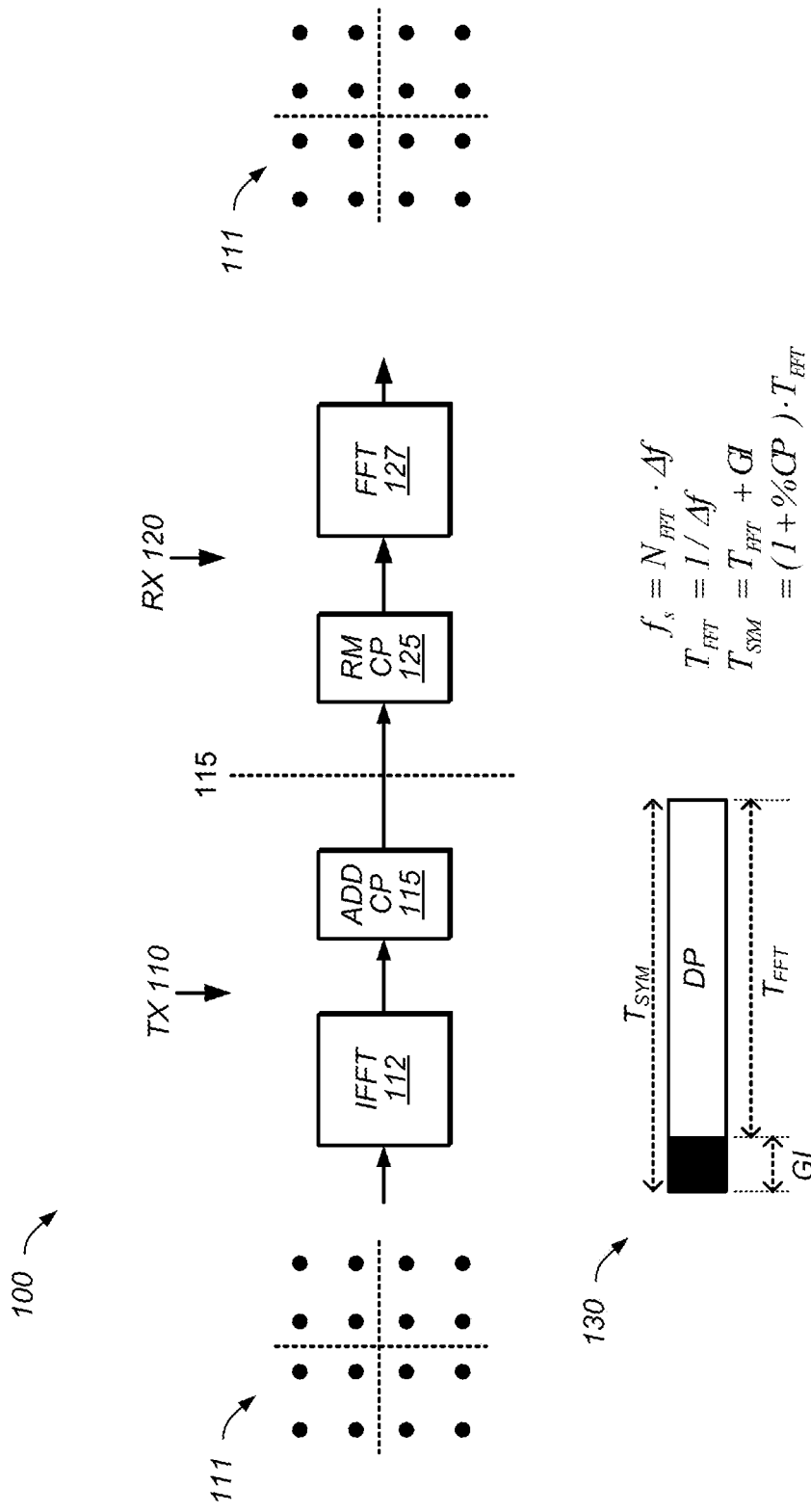
FIG. 1B illustrates one embodiment of an OFDM data pump.

FIG. 1B illustrates an OFDM data pump 100 according to one embodiment. The OFDM data pump includes a transmitter 110 and receiver 120. The transmitter 110 transmits to the receiver 120 through a transmission medium 115.

The transmitter 110 includes an inverse Fast Fourier Transform (IFFT) unit 112 and a cyclic prefix (CP) addition unit 115. (More generally, the unit 112 may perform an inverse Discrete Fourier Transform.) The inverse FFT unit is configurable (or programmable) so that the IFFT size $N_{FFT}$ may be changed. The CP addition unit is configurable (or programmable) so that the cyclic prefix size may be changed. To form an OFDM symbol, the IFFT unit 112 converts a collection of $N_{FFT}$ subcarrier symbols (e.g., QAM symbols) to a collection of $N_{FFT}$ time domain samples. Each subcarrier symbol may be selected from a constellation (e.g., a QAM constellation or PSK constellation). While a 16 QAM constellation (labeled 111) is shown in FIG. 1B, any of a wide variety of constellations may be used. Indeed, the constellation may be selected (e.g., by a system operator, or automatically, by a control algorithm) from a set of supported constellations.

The CP addition unit 115 adds a cyclic prefix to the collection of time domain samples, to obtain an augmented collection of samples. (The cyclic prefix is used to improve the receiver's tolerance to multipath-induced delay spread.) The transmitter also includes a digital-to-analog converter (not shown) to convert the augmented set of samples to the analog domain. The resulting analog OFDM signal is transmitted using RF transmission circuitry.

The receiver 120 receives the OFDM signal using RF receiver circuitry. The received OFDM signal is converted into a stream of samples using analog-to-digital conversion circuitry. The CP removal unit 125 removes samples corresponding to the cyclic prefix. (Removal of the CP may serve to eliminate inter-symbol interference, and enable a simple, single-tap equalization per subcarrier, provided the delay spread is fully contained within the guard interval GI.) The remaining collection of $N_{FFT}$ samples is supplied to Fast Fourier Transform (FFT) unit 127 for conversion to a collection of $N_{FFT}$ subcarrier symbols. The FFT unit is configurable (or programmable) so that the FFT size $N_{FFT}$ may be changed. Similarly, the CP removal unit is configurable (or programmable) so that the cyclic prefix size may be changed.

The transmitter 110 may generate frames, where each frame includes a plurality of OFDM symbols. As shown at 130, each OFDM symbol includes a guard interval (GI) and a data portion DP. The guard interval contains the cyclic prefix of the OFDM symbol. The duration of the guard interval may be configured based on the maximum expected delay spread experienced by user devices receiving from the transmitter. (Delay spread is the time difference between the first arriving multipath component and the last arriving multipath component at the receiver.) In a small cell, the maximum expected delay spread may be smaller than for a larger cell. Furthermore, the separation between transmitters in a single frequency network (SFN) also constitutes a source of delay spread for receivers in range of both transmitters. Thus, the size of the guard interval may scale with the size of the cell or the desired range of the transmitter, or, in the case of an SFN, the separation between the transmitters.

In OFDM, the number of samples in the data portion DP is equal to the FFT size $N_{FFT}$ used to perform the IFFT. Thus, the duration $T_{FFT}$ of the data portion is determined by the FFT size $N_{FFT}$ and the sample rate. (At the transmitter, the sample rate is the rate at which the digital-to-analog converter operates to convert samples provided by the IFFT unit 112. At the receiver, the sample rate is the rate at which the analog-to-digital converter produces samples from the received analog signal.) Furthermore, the spacing Δf between adjacent subcarriers of the OFDM signal is constrained by the relation $$\Delta f = f_s / N_{FFT}, \qquad (1)$$

where $f_s$ is the sample rate. In particular, observe that, for any given sample rate $f_s$, the subcarrier spacing is inversely related to the FFT size $N_{FFT}$. If a user device is moving with respect to the transmitter, the OFDM signal received by the user device will be Doppler shifted by an amount that depends on the radial component of velocity of the user device. If the subcarrier spacing of the OFDM signal is not large enough relative to the Doppler shift, the ability of the UE device to faithfully decode the OFDM signal will be compromised. Thus, the subcarrier spacing may be configured (by appropriate choice of the FFT size and/or sampling rate $f_s$) based on the expected maximum mobility of user devices in the cell of the transmitter 110.

System Parameters

In some embodiments, basic system parameters may be selected on the basis of the available signal bandwidth. The FFT dimension $N_{FFT}$ and subcarrier spacing Δf relate to the required sampling rate $f_s$ and occupied bandwidth B as follows:

$$f_s = N_{FFT} \cdot \Delta f, \qquad (2A)$$

$$B = N_{SC} \cdot \Delta f, \qquad (2B)$$

$$T_{FFT} = 1/\Delta f, \qquad (2C)$$

$$T_{SYM} = GI + T_{FFT} \qquad (2D)$$

$$= (CP\% + 1) \cdot T_{FFT} \qquad (2E)$$

where $N_{SC}$ is the number of powered data subcarriers, where CP % equals $GI/T_{FFT}$. (The $N_{SC}$ powered data subcarriers are chosen as a proper subset of the $N_{FFT}$ subcarriers, allowing a guard band between adjacent channels.) If we constrain the duration of each OFDM symbol in a superframe (or frame) to be equal, and require that the data-carrying portion(s) of the superframe (or frame) contain an integer number $N_{sym}$ of OFDM symbols with no excess samples, then the possible combinations of values of parameters such as $N_{sym}$, $N_{FFT}$, fs, B and CP % are not completely arbitrary. However, by allowing parameters such as $N_{FFT}$, fs and B to take values from dense ranges of values, we can ensure that a parameter value combination can be found that meets the system requirements while adhering to the requirement that superframe (or frame) contain an integer number of OFDM symbols.

Performance Metrics

System parameters may be selected to maximize one or more performance metrics. It is the operator's aim to select a system configuration that simultaneously delivers reliable performance given expected cell characteristics for a given deployment.

Doppler Speed

The operator may specify the level of mobility expected in a cell (or at a given time of day) in terms of the maximum expected velocity VD of user devices in the cell. The maximum expected Doppler shift $DS_{ME}$ depends on the maximum expected velocity according to the relation $$DS_{ME} = \frac{f_C V_D}{c}, \qquad (3)$$

where c is the speed of light, where $f_C$ is the carrier frequency of the transmitted OFDM signal. To ensure reliable demodulation, the maximum expected Doppler shift and the subcarrier spacing Δf are typically constrained so that the maximum expected Doppler shift is no more than a fraction k of the subcarrier spacing Δf:

$$DS_{ME} = \frac{f_C V_D}{c} \leq k \Delta f, \qquad (4)$$

where 0<k<1. The value of the fraction k may vary with different embodiments.

Range

In some embodiments, Range R (e.g., the separation between broadcast towers in an SFN) may be determined by the Guard Interval GI according to the relation:

$$R = c \cdot GI. \tag{5A}$$

$$= c \cdot T_{FFT} \cdot CP\% \tag{5B}$$

System Configuration Worksheet

System configuration may be performed with the aid of a system configuration worksheet (or spreadsheet). The worksheet permits a system designer to explore a nearly exhaustive range of configuration parameters in a systematic way, applying a set of prescribed criteria to find the configuration best suited for a particular deployment scenario.

Control Panel

The control panel may be used to provide the basic system setup. It may be used by a system designer to specify parameters such as the signal bandwidth $B_{sig}$ and sampling rate $f_s$. The worksheet may also allow the designer to specify sub-frame, frame and super-frame durations. The super-frame duration may be used to determine the combinations of configuration parameters from the myriad choices that are suitable for a given system deployment. Table 1 (i.e., FIG. 2) shows an embodiment 200 of the control panel. The designer (or system operator) may enter values of parameters such as signal bandwidth parameters, signal duration parameters and miscellaneous parameters. The signal bandwidth parameters may include nominal channel bandwidth $B_{chan}$, occupied signal bandwidth $B_{sig}$, sample rate $f_s$ and number of resource blocks NRBs. The signal duration parameters may include subframe duration (sf), frame duration (F) and super-frame duration (SF). The miscellaneous parameters may include the maximum allowable cyclic prefix percentage (MAX CP %), the number of subcarriers $N_{SC}$ per resource block per symbol period, the subcarrier spacing $\Delta f$ and the nominal resource block bandwidth RB_BW. Some of the parameters shown in Table 1 may be interdependent. For example, NRBs and $N_{SC}$ may be dependent on the allocated channel bandwidth minus any guard band between adjacent channels.

The units shown in Table 1 for the various parameters are exemplary, and may vary for different embodiments. Furthermore, in other embodiments, other sets of controllable parameters may be used.

Parameter Selection

The process may begin by first eliminating the configurations (i.e., combinations of parameter values) that do not yield an integer number of OFDM symbols (i.e., OFDM symbols that include cyclic prefix) within the specified super-frame duration. The OFDM symbol duration $T_{SYM}$ is determined by the FFT duration $T_{FFT}$ and CP % for a given sampling rate. (CP % is the ratio $GI/T_{FFT}$.) The sampling rate may be determined as a function of the available channel bandwidth and associated subcarrier spacing ($\Delta f$):

$$f_s = N_{FFT} \cdot \Delta f, \tag{6A}$$

$$B_{sig} = N_{SC} \cdot \Delta f, \tag{6B}$$

where $N_{SC}$ is the number of powered data subcarriers. Furthermore, $$T_{FFT} = 1/\Delta f \tag{7A}$$

$$T_{SYM} = GI + T_{FFT} \tag{7B}$$

$$= (CP\% + 1) \cdot T_{FFT}. \tag{7C}$$

The number $N_{SYM}$ of OFDM symbols per super-frame is determined from the super-frame duration, as specified in the control panel, divided by the OFDM symbol duration $T_{SYM}$. The number $N_{SYM}$ may be computed for each combination of FFT dimension $N_{FFT}$ and CP %. (FFT dimension is also referred to herein as "FFT size".) The possible values of FFT dimension may be listed in increasing order based on a prescribed formula, to facilitate ease of implementation. The possible values of FFT dimension may conform to a prime-power formula such as $N_{FFT}=5^m 3^n 2^p$, where m, n and p are non-negative integers, as illustrated in Table 2 (i.e., FIG. 3). The candidate values for CP % are rational fractions covering a nearly exhaustive range. (A rational fraction is a fraction of the form N/D, where N and D are positive integers. Integer D may be constrained by the possible values of $N_{FFT}$.) Combinations of $N_{FFT}$ and CP % that yield an integer value for $N_{SYM}$ are identified. These combinations (also referred to as "configurations") will be subjected to the next level in parameter screening. The tabulated number field 210 shows two such combinations:

($N_{FFT}$, CP %)=(3072, 1.69%) corresponding to $N_{SYM}$=118; and ($N_{FFT}$, CP %)=(6144, 1.69%) corresponding to $N_{SYM}$=59.

The lines connecting the sample rate value $f_s$=9.216 Megasample/sec and channel bandwidth value $B_{chan}$=6 MHz to the number field 210 indicate that the values of $N_{SYM}$ given in the number field are dependent on the sample rate value and the channel bandwidth value.

While only five values of CP % and 23 values of $N_{FFT}$ are shown in Table 2 (i.e., FIG. 3), it should be understood that any number of CP % values and any number of $N_{FFT}$ value may be explored. Indeed, only a small portion of the tabulated number field 210 is shown in Table 2 (FIG. 3).

As noted above, in some embodiments, $N_{FFT}$ may be a product of powers of distinct primes $p_1, p_2, \ldots, p_m$:

$$N_{FFT} = (p_1)^{n_1}(p_2)^{n_2} \ldots (p_{m-1})^{n_{m-1}}(p_m)^{n_m}, \tag{8A}$$

where $n_1, n_2, \ldots, n_m$ are non-negative integers. The distinct primes preferably include 2 so that at least a portion of the $N_{FFT}$-point Discrete Fourier Transform may be implemented using the FFT algorithm. Thus, the prime-power decomposition of $N_{FFT}$ may have the form $$N_{FFT} = (p_1)^{n_1}(p_2)^{n_2} \ldots (p_{m-1})^{n_{m-1}}(p_m)^{n_m}, \tag{8B}$$

In some embodiments, the power-of-two term in the decomposition may dominate (e.g., substantially dominate) the product of the remaining terms, i.e., $$(p_1)^{n_1}(p_2)^{n_2} \ldots (p_{m-1})^{n_{m-1}} \ll (2)^{n_m}. \tag{8C}$$

Since the $N_{FFT}$-point Discrete Fourier Transform can be decomposed into an efficient FFT of size $K=2^{\wedge}(n_m)$ and less efficient DFTs of size $N_{FFT}/K$, the dominance of the power of two increases the overall efficiency of the $N_{FFT}$-point DFT. While allowing primes other than two in the collection of distinct primes provides a denser set of values of $N_{FFT}$, and thus, increased probability of finding integer-valued solutions for $N_{SYM}$, it is desirable to control the computational complexity of the $N_{FFT}$-point DFT. Thus, the values of $n_1, n_2, \ldots, n_{m-1}$ may be limited so that $(p_1)^{n_1}(p_2)^{n_2} \ldots (p_{m-1})^{n_{m-1}}$ is small compared to $2^{\wedge}(n_m)$.

Operator's Panel

The operator's panel enables a broadcaster to establish performance objectives for a given system deployment. The operator may specify the carrier frequency $f_C$, range target R, and user mobility. The user mobility may be specified (or indicated), e.g., in terms of the maximum expected velocity v of user devices. The range target determines the required minimum Guard Interval (GI) of transmitted OFDM symbols. (The cyclic prefix of OFDM symbols should have duration greater than or equal to the minimum Guard Interval.) The maximum expected Doppler shift, computed from the maximum expected velocity, determines the minimum allowed subcarrier spacing. See Table 3 (i.e., FIG. 4), which shows an embodiment 400 of the operator's panel. The operator may also specify the modulation scheme (mod), the number of bits per subcarrier symbol, the coding rate k/n (e.g., for binary convolutional coding prior to the mapping of bits to subcarrier symbols), and the signaling overhead percentage (ovr). Signaling overhead is defined as any symbol periods reserved for carrying non-user data, e.g. synchronization signals, parameter selection, as well as subcarrier reserved for carrying pilots.

In some embodiments, Range Target R of the operator's panel may be set (by the operator) based on the separation between broadcast towers. Range Target may determine the minimum Guard Interval GI and/or minimum CP % according to:

$$R = c \cdot GI_{min}. \quad (9A)$$
$$= c \cdot T_{FFT}(CP\%)_{min} \quad (9B)$$

The guard interval of the OFDM symbol should be greater than or equal to the minimum guard interval $GI_{min}$.

The Doppler Speed v of the operator's panel represents the maximum level of mobility anticipated in the cell (or at a given time of day), which determines the maximum expected Doppler shift $DS_{ME}$ according to the relation $$DS_{ME} = \frac{f_C V}{c}. \quad (10)$$

To guarantee reliable demodulation, the maximum tolerable Doppler shift $DS_{MaxTol}$ is set equal to a fraction k (such as 5% or 10% or 15%) of the subcarrier spacing:

$$DS_{MaxTol} = k\Delta f. \quad (11)$$

The maximum expected Doppler shift $DS_{ME}$ should be less than or equal to the maximum tolerable Doppler shift $DS_{MaxTol}$:

$$DS_{ME} \leq DS_{MaxTol} \quad (12)$$
$$\frac{f_C V}{c} \leq k\Delta f. \quad (13)$$

Thus, given the fraction k, the maximum expected Doppler shift defines a minimum allowed value for the subcarrier spacing Δf. Note that the Doppler shift requirement (13) may be equivalently expressed as a Doppler velocity requirement:

$$V \leq \frac{kc\Delta f}{f_C}, \quad (14)$$

where $k*c*\Delta f/f_C$ is the maximum tolerable Doppler velocity. In Table 4 (i.e., FIG. 5), the two columns labeled "Max Doppler" correspond to this maximum tolerable Doppler velocity in the case where k=0.1.

Range and Delay Spread Tolerance

Simultaneous transmissions from multiple towers (e.g., as would occur when a plurality of transmitters are operated as a single frequency network) result in significant multipath to any user devices in range of both towers. The desired range (i.e., the Range Target R) specified by the operator in the operator panel determines the minimum guard interval $GI_{MIN}$ needed to provide the required delay spread tolerance. The guard interval corresponding to a given combination of $N_{FFT}$ and CP % (assuming a given sample rate $f_S$) is given by $$GI = (CP \%)N_{FFT}/f_S. \quad (15)$$

A valid combination of parameters should satisfy the minimum Guard Interval constraint:

$$GI_{MIN} \leq GI. \quad (16)$$

The coverage allowed by a given system configuration (i.e., a combination of parameter values) depends on the guard interval GI. Large/small guard interval implies large/small coverage. The coverage corresponding to a system configuration may be computed based on one or more of the following expressions:

$$\text{Coverage} = c*GI \quad (17A)$$

$$\text{Coverage} = c*(CP \%)T_{FFT} \quad (17B)$$

$$\text{Coverage} = c*(CP \%)N_{FFT}/f_S. \quad (17C)$$

The number field 510 in Table 4 (i.e., FIG. 5) includes values of Coverage (in kilometers) for various combinations of values of $N_{FFT}$ and CP %.

As shown in Table 4 (i.e., FIG. 5), the values of FFT size that yield a subcarrier spacing Δf that meets or exceeds the Doppler shift requirement (13) are highlighted in bold. ($N_{FFT}$=16384 is the largest of those FFT sizes, and it displayed in the $N_{FFT}$ field of the operator's panel.) Combinations that additionally conform to the constraint of an integer number $N_{SYM}$ of symbols per super-frame are retained for further consideration.

CP Overhead and System Throughput

The final objective in selecting system parameters is to maximize system throughput. The operator's panel also permits specification of the modulation order, e.g. QPSK, 16-QAM, 64-QAM, 256-QAM, as well as the coding rate k/n applied to the broadcast transmission in a deployed cell. See Table 5 (i.e., FIG. 6).

The spreadsheet may select the largest FFT dimension (i.e., FFT size) that meets the Doppler shift requirement discussed further below. (Recall that the basic relation $\Delta f = f_S/N_{FFT}$ implies that, given fixed sampling rate $f_s$, subcarrier spacing Δf decreases as $N_{FFT}$ increases.) This smallest FFT dimension is displayed in the FFT dimension field (denoted $N_{FFT}$) in the operator's panel.

For the selected FFT dimension, the spreadsheet may further select the smallest CP % value that yields an integer value for $N_{SYM}$ (number of symbols per superframe) and satisfies the guard interval constraint $GI \geq GI_{MIN}$, or equivalently, the range constraint Coverage≥Range Target. That smallest CP % value is used to compute a corresponding symbol duration (i.e., guard interval GI plus FFT duration $T_{FFT}$), which is displayed in the $T_{SYM}$ field of the operator's panel. In the illustrated example, CP %=12.5% is the smallest CP % value that gives integer value of $N_{SYM}$ and Coverage≥Range Target=50 km for $N_{FFT}$=16384. Thus, $T_{SYM}$=2000 is selected.

The spectral efficiency may be calculated (e.g., in bps/Hz) for the selected modulation scheme and coding rate given $T_{SYM}$. The spectral efficiency may be displayed in field 610 of the operator's panel.

Throughput may be computed as the number of bits delivered per OFDM symbol as a function of the selected modulation and coding rate minus additional framing overhead for synchronization and other signaling divided by the symbol duration.

Delivered System Performance

The final configuration shown in Table 5 (i.e., FIG. 6) delivers spectral efficiency of 8.19 bps/Hz corresponding to $N_{FFT}$=16384 and CP=12.5%. This configuration permits mobility up to 100 kph over a 50 km cell radius operating at $f_c$=600 MHz. While the operation of the presently disclosed spreadsheet has been described in terms of specific values of input parameters, it should be understood that the spreadsheet may be used with any combination of input parameter values.

Figure 7:
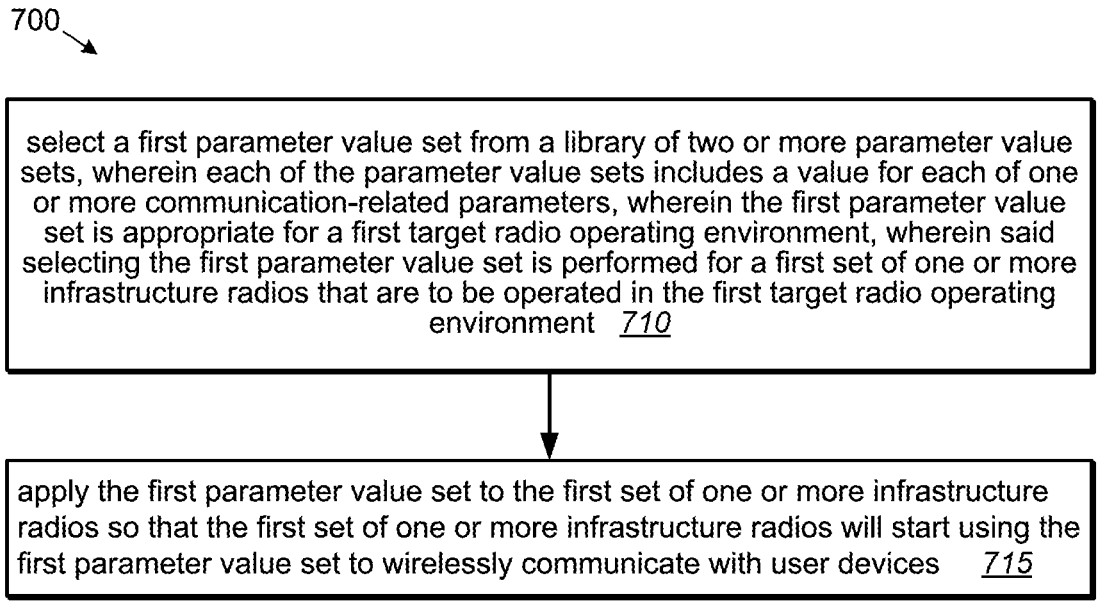
FIG. 7 illustrates one embodiment of a method for configuring a wireless network for one of a plurality of radio operating environments.

In one set of embodiments, a method 700 for operating a wireless network in a plurality of radio operating environments may include the operations shown in FIG. 7. (The method 700 may also include any subset of the features, elements and embodiments described above.) The method may be performed by a computer system in response to the execution of stored program instructions.

At 710, the computer system may select a first parameter value set from a library of two or more parameter value sets, wherein each of the parameter value sets includes a value for each of one or more communication-related parameters. In one embodiment, the one or more communication-related parameters include FFT size $N_{FFT}$ and cyclic prefix percentage as variously described above. The first parameter value set is appropriate for a first target radio operating environment. The action of selecting the first parameter value set is performed for a first set of one or more infrastructure radios that are to be operated in the first target radio operating environment.

In some embodiments, at least one of the two or more parameter value sets in the library may be optimized for communication with mobile devices (e.g., handsets, tablets, radios in cars, etc). For example, such a parameter value set may include a larger value of subcarrier spacing than would be used for fixed devices. Furthermore, at least one of the two or more parameter value sets in the library may be optimized for communication with fixed devices (e.g., wireless access radios in homes, televisions, etc.). The scope of meaning of the term "communication" is to be interpreted broadly as including unicast (e.g., as in LTE, WiFi and so on), multicast, broadcast, and any combination of the foregoing.

At 715, the computer system may apply the first parameter value set to the first set of one or more infrastructure radios so that the first set of one or more infrastructure radios will start using the first parameter value set to wirelessly communicate with user devices.

In some embodiments, the selecting operation 710 and the applying operation 715 are performed by a configuration controller of the wireless network.

In some embodiments, the method 700 may include generating a list of possible values for each of the one or more communication-related parameters (e.g., FFT size and CP %), in which case, the action of selecting a first parameter value set includes selecting a value from each of the one or more lists so that the combination of the selected values satisfies one or more of the following constraints: the combination yields an integer number of symbols (e.g., OFDM symbols) per superframe; the combination satisfies an operator-specified constraint on mobility; and the combination satisfies an operator-specified constraint on range.

In some embodiments, the combination of selected values maximizes throughput subject to the one or more constraints, e.g., as variously described above in connection with the spreadsheet.

In some embodiments, the two or more parameter value sets defining the library have been chosen from a global space of possible parameter value sets based on one or more criteria.

In some embodiments, the one or more criteria may include a requirement that the number of symbols (e.g., OFDM symbols) per superframe be an integer.

In some embodiments, the one or more criteria include a requirement that subcarrier frequency spacing $\Delta f$ is greater than or equal to a minimum value determined based on a specified maximum target Doppler shift or a specified maximum velocity.

In some embodiments, the one or more criteria include a requirement that a guard interval is greater than or equal to a minimum value based on a specified maximum expected range of infrastructure radio transmission.

In some embodiment, the one of the one or more communication-related parameters include OFDM FFT size, wherein the one or more criteria include a criterion that represents computational efficiency of implementing the OFDM FFT size.

In some embodiments, the FFT size is constrained to be a product of powers of a fixed set of prime numbers.

In some embodiments, the one of the one or more communication-related parameters includes a cyclic prefix (CP) percentage, wherein the CP percentage is computed as an integer in the numerator divided by an integer in the denominator. The cyclic prefix may be inserted as the smallest integer number of samples that meets the CP %.

In some embodiments, the CP percentage is computed in increasing order, e.g., up to a specified maximum viable CP percentage.

In some embodiments, the library includes two or more default parameter value sets (e.g., a default set optimized for broadcast in an urban environment, a default set optimized for broadcast in a rural environment, a default set optimized for compatibility with another wireless system such as LTE, a default set optimized for mobile communication, a default set optimized for fixed communication, a default set used to communicate system information). Each user device and each infrastructure radio of the wireless network may support the default parameter value sets, i.e., may be reconfigurable for wireless communication using any of the default parameter value sets.

In some embodiments, the first parameter value set is not one of the default parameter value sets.

In some embodiments, in a baseline state of the library, all parameter value sets in the library are default parameter value sets.

In some embodiments, the method 700 also includes extending the library with one or more additional parameter value sets.

In some embodiments, the default parameter value sets are pre-loaded in the infrastructure radios and/or user devices at manufacturing time.

In some embodiments, the action of applying the first parameter value set is performed by sending first information to each infrastructure radio of the first set of one or more infrastructure radios. The first information identifies the first parameter value set.

In some embodiments, the first information includes the first parameter value set.

In some embodiments, at least a given one of the infrastructure radios of the first set of one or more infrastructure radios stores a local copy of the library. The given infrastructure radio may be configured to add the first parameter value set to the local copy of the library.

In some embodiments, each infrastructure radio of the first set of one or more infrastructure radios stores a local copy of the library, wherein the first information comprises a set pointer that points to the first parameter value set among the two or more parameter value sets in the library.

In some embodiments, the one or more infrastructure radios of the first set are configured at least to wirelessly transmit to user devices using OFDM. The one or more communication-related parameters may include one or more of the following: a number of symbols per superframe; channel bandwidth; occupied bandwidth (or occupied signal); sampling rate; number of resource blocks; subframe duration; frame duration; superframe duration; number of subcarriers per resource block per symbol period; nominal subcarrier spacing; nominal resource block bandwidth; FFT size; cyclic prefix size (or cyclic prefix percentage); target range; carrier center frequency; user mobility requirement (e.g., in terms of maximum velocity or Doppler shift); modulation scheme; coding rate; signaling overhead.

In some embodiments, the method 700 may also include: selecting a second parameter value set from the library of two or more parameter value sets, wherein the second parameter value set is appropriate for a second target radio operating environment different from the first target radio operating environment, wherein said selecting the second parameter value set is performed for a second set of one or more infrastructure radios that are to be operated in the second target radio operating environment; and applying the second parameter value set to the second set of one or more infrastructure radios so that that the second set of one or more infrastructure radios will start using the second parameter value set to wirelessly communicate with user devices.

In some embodiments, said applying the second parameter value set is performed by sending second information to the second set of one or more infrastructure radios, wherein the second information identifies the second parameter value set.

In some embodiments, the second information includes the second parameter value set.

In some embodiments, each infrastructure radio of the second set of one or more infrastructure radios stores a local copy of the library, wherein the second information comprises a set pointer that points to the second parameter value set among the two or more parameter value sets in the library.

In some embodiments, the method 700 also includes, in response to determining that the first set of one or more infrastructure radios are to be operated in a second target radio operating environment different from the first target radio operating environment, selecting a second parameter value set from the library, wherein the second parameter value set is appropriate for the second target radio operating environment. The second parameter value set may then be applied to the first set of one or more infrastructure radios so that that the first set of one or more infrastructure radios will start using the second parameter value set to wirelessly communicate with user devices.

In some embodiments, the action of applying the second parameter value set to the first set of one or more infrastructure radios is performed by sending second information to the first set of one or more infrastructure radios, wherein the second information identifies the second parameter value set.

In some embodiments, the second information includes the second parameter value set.

In some embodiments, each infrastructure radio of the first set of one or more infrastructure radios stores a local copy of the library, wherein the second information comprises a set pointer that points to the second parameter value set among the two or more parameter value sets in the library.

In some embodiments, the wireless network is a wireless broadband network.

In some embodiments, the wireless network is a television broadcast network.

In some embodiments, the one or more infrastructure radios are configured at least to wirelessly transmit to user devices using OFDM.

In some embodiments, each of the one or more infrastructure radios includes a transmitter.

In some embodiments, each of the one or more infrastructure radios includes a transceiver.

In some embodiments, the first target radio operating environment is an urban environment.

In some embodiments, the first target radio operating environment is a rural environment.

In some embodiments, the first target radio operating environment is for communication with mobile devices.

In some embodiments, the first target radio operating environment is for communication with fixed devices.

In some embodiments, the selection of the first parameter value set is pre-determined.

In some embodiments, the selection of the first parameter value set is performed in real time.

In some embodiments, the method 700 also includes time multiplexing the transmission of system information (including, e.g., the first parameter value set and other control information) and user data from the infrastructure radio to the user device.

In some embodiments, the system information is transmitted in the narrowest signal bandwidth (in a set of supported bandwidths) using the lowest order modulation (in a set of supported modulation orders) to accommodate devices new to the network that are as yet unaware of the first parameter value set.

Figure 8:
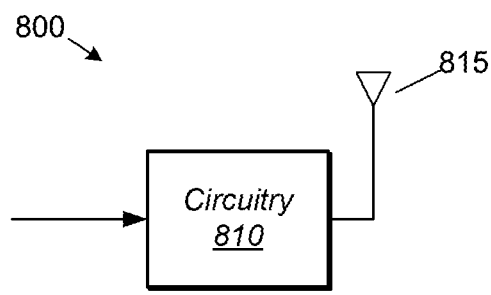
FIG. 8 illustrates one embodiment of an infrastructure radio in a wireless network.

In one set of embodiments, an infrastructure radio 800 in a wireless network may be configured as shown in FIG. 8. (The infrastructure radio 800 may also include any subset of the features, elements and embodiments described above.) The instructor radio may include circuitry 800 and antenna system 815.

Circuitry 810 may be configured to receive first information from a configuration controller of the wireless network. For example, circuitry 810 may include a network interface or modem for generally communicating via the Internet or other computer network. The first information identifies a first parameter value set from a library of two or more parameter value sets. Each of the parameter value sets includes a value for each of one or more communication-related parameters. The first parameter value set is appropriate for a first target radio operating environment.

Circuitry 810 may be further configured to reconfigure the infrastructure radio to wirelessly communicate with user devices using the first parameter value set. In some embodiments, circuitry 810 may include a controller and waveform generation circuitry. The controller may program the waveform generation circuitry to use the values of the first parameter value set when it generates symbols (e.g., OFDM symbols) to be transmitted.

Circuitry 810 may be configured to transmit the first parameter value set or the first information identifying the first parameter value set to the user devices so that the user devices may reconfigure themselves to communicate wirelessly with the infrastructure radio using the first parameter value set. In some embodiments, the circuitry 810 may use a tree-based mechanism for transmitting system information, including the first parameter value set (or the first identifying information), to the user devices. In the tree-based mechanism, the value of a current control field may determine the kind of control information to be included in the next control field. Thus, a given control field may have different meanings in different transmitted superframes or frames.

In some embodiments, the two or more parameter value sets defining the library have been chosen (e.g., by the configuration controller or pre-determined and pre-loaded to the infrastructure radio) from a global space of possible parameter value sets based on one or more criteria.

In some embodiments, the library includes two or more default parameter value sets (e.g., a default set optimized for broadcast in an urban environment, a default set optimized for broadcast in a rural environment, a default set optimized for compatibility with another network such as LTE, a default set optimized for mobile communication, a default set optimized for fixed communication, a default set used to communicate system information). The infrastructure radio and each user device of the wireless network may support the default parameter value sets, i.e., may be reconfigurable for wireless communication using any of the default parameter value sets.

In some embodiments, the first information includes the first parameter value set itself.

In some embodiments, the circuitry is configured to store a local copy of the library, and to add the first parameter value set to the local copy of the library after receiving said first information.

In some embodiments, the action of transmitting the first parameter value set (or the first information identifying the first parameter value set) to the user devices is performed using a wireless channel based on one of the default parameter value sets.

In some embodiments, the first parameter value set is not one of the default parameter value sets.

In some embodiments, the infrastructure radio stores a local copy of the library, wherein the first information includes a set pointer that points to the first parameter value set among the two or more parameter value sets in the library.

In some embodiments, the circuitry includes one or more RF transceivers, one or more baseband processors, and one or more control processors.

In some embodiments, the one or more control processors are configured to time multiplex the transmission of the parameter value set with user data. For example, the parameter value set may be sent periodically in the same manner that LTE periodically broadcasts system information in the narrowest signal bandwidth using the lowest order modulation to accommodate devices new to the network that are as yet unaware of the assigned parameter value set.

In some embodiments, the circuitry includes an RF broadcast transmitter, a baseband processor and a control processor.

In some embodiments, the circuitry is further configured to: receive second information from the configuration controller, wherein the second information identifies a second parameter value set from the library, wherein the second parameter value set is appropriate for a second target radio operating environment different from the first target radio operating environment; reconfigure the infrastructure radio to wirelessly communicate with user devices using the second parameter value set; and transmit the second parameter value set (or the second information identifying the second parameter value set) to the user devices so that the user devices may reconfigure themselves to communicate wirelessly with the infrastructure radio using the second parameter value set.

In some embodiments, the second information includes the second parameter value set itself.

In some embodiments, the infrastructure radio stores a local copy of the library, wherein the second information comprises a set pointer that points to the second parameter value set among the two or more parameter value sets in the library.

In some embodiments, the circuitry is configured to wirelessly communicate with the user device using OFDM.

In some embodiments, transmission of system information is performed by time multiplexing the transmission of system information with user data, wherein the system information includes the first parameter value set (or alternative parameter value set) and perhaps other control information.

In some embodiments, the system information is transmitted in the narrowest signal bandwidth (in a set of supported signal bandwidths) using the lowest order modulation (in a set of supported modulation orders) to accommodate devices new to the network that are as yet unaware of the first parameter value set.

Figure 9:
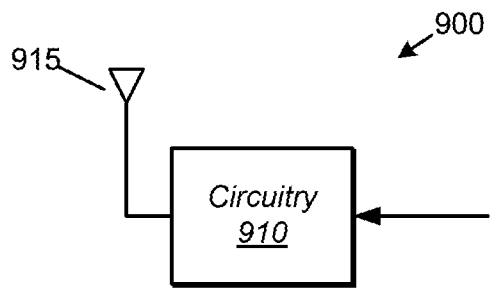
FIG. 9 illustrates one embodiment of a user device for communication with a wireless network.

In one set of embodiments, a user device 900 for communication with a wireless network may be configured as shown in FIG. 9. (The user device 900 may also include any subset of the features, elements and embodiments described above.) The user device 900 may include circuitry 910 and antenna system 915.

Circuitry 910 may be configured to receive first information from an infrastructure radio of the wireless network, where the first information identifies a first parameter value set from a library of two or more parameter value sets. Each of the parameter value sets includes a value for each of one or more communication-related parameters. The first parameter value set is appropriate for a first target radio operating environment.

Circuitry 910 may be configured to reconfigure the user device to wirelessly communicate with the infrastructure radio using the first parameter value set. For example, circuitry 910 may include a controller and waveform processing circuitry. The controller may program the waveform processing circuitry to use the parameter values of the first parameter value set when generate transmit waveforms and/or when decoding received waveforms.

In some embodiments, at least one of the two or more parameter value sets in the library may be optimized for communication with mobile devices (e.g., handsets, tablets, radios in cars, etc). For example, such a parameter value set may include a larger value of subcarrier spacing than would be used for fixed devices. Furthermore, at least one of the two or more parameter value sets in the library may be optimized for communication with fixed devices (e.g., wireless access radios in homes, televisions, etc.).

In some embodiments, the user device is a mobile device. In other embodiments, the user device is a fixed device.

In some embodiments, the two or more parameter value sets defining the library have been chosen (e.g., by the configuration controller or pre-determined and pre-loaded to the user device) from a global space of possible parameter value sets based on one or more criteria.

In some embodiments, the library includes two or more default parameter value sets (e.g., a default set optimized for broadcast in an urban environment, a default set optimized for broadcast in a rural environment, a default set optimized for compatibility with another wireless system such as LTE, a default set optimized for mobile communication, a default set optimized for fixed communication, a default set used to communicate system information). The user device and each infrastructure radio of the wireless network may support the default parameter value sets, i.e., may be reconfigurable for wireless communication using any of the default parameter value sets.

In some embodiments, the first parameter value set is not one of the default parameter value sets.

In some embodiments, the first information includes the first parameter value set itself.

In some embodiments, the user device 900 also includes memory storing a local copy of the library, wherein the circuitry is configured to add the first parameter value set to the local copy of the library after said receiving the first information.

In some embodiments, the infrastructure radio transmits the first parameter value set or the first information identifying the first parameter value set to the user device using a wireless channel (e.g., a broadcast channel or a broadband channel) based on one of the default parameter value sets.

In some embodiments, the user device stores a local copy of the library, wherein the first information comprises a set pointer that points to the first parameter value set among the two or more parameter value sets in the library.

In some embodiments, the infrastructure radio is a broadcast transmitter.

In some embodiments, the infrastructure radio is a wireless broadband basestation (e.g., WiFi, LTE, Whitespace, etc.).

In some embodiments, the infrastructure radio is a combination of wireless broadband basestation and broadcast transmitter. For example, WiFi, LTE, Whitespace, etc. may be used concurrently with the broadcast channel. Broadband channels can be used to communicate control information between the base station and the user devices.

In some embodiments, the circuitry is further configured to: receive second information from the infrastructure radio, wherein the second information identifies a second parameter value set from the library, wherein the second parameter value set is appropriate for a second target radio operating environment; and reconfigure the user device to wirelessly communicate with the infrastructure radio using the second parameter value set.

In some embodiments, the second information comprises the second parameter value itself.

In some embodiments, the user device stores a local copy of the library, wherein the second information comprises a set pointer that points to the second parameter value set among the two or more parameter value sets in the library.

In some embodiments, the circuitry is further configured to: receive second information from another infrastructure radio of the wireless network, wherein the second information identifies a second parameter value set from the library, wherein the second parameter value set is appropriate for a second target radio operating environment; and reconfigure the user device to wirelessly communicate with the other infrastructure radio using the second parameter value set.

In some embodiments, the second information comprises the second parameter value set itself.

In some embodiments, the user device stores a local copy of the library, wherein the second information comprises a set pointer that points to the second parameter value set among the two or more parameter value sets in the library.

In some embodiments, the above-described action of wirelessly communicating with the infrastructure radio includes receiving a broadcast signal transmitted by the infrastructure radio.

In some embodiments, the action of wirelessly communicating with the infrastructure radio includes: transmitting uplink signals to the infrastructure radio; and receiving unicast download signals and/or broadcast downlink signals transmitted by the infrastructure radio.

In some embodiments, the circuitry 910 is configured to wirelessly communicate with the infrastructure radio using OFDM.

In some embodiments, system information is received through the time multiplexing of the system information with user data by the infrastructure radio (i.e., system data and user data on the same communication channel). The system information may include the first information and perhaps other control information as well.

In some embodiments, the system information is transmitted from the infrastructure radio to the user device in the narrowest signal bandwidth (in a set of supported bandwidths) using the lowest order modulation (in a set of supported modulation orders) to accommodate devices new to the network that are as yet unaware of the first parameter value set.

Some of the embodiments described herein may be realized in a mobile device, e.g., a mobile phone, tablet computer, a digital media player, a personal digital assistant, a mobile television receiver, etc.

Some of the embodiments described herein may be realized in a user device, e.g., a mobile device or a non-mobile device. For example, a user device may be a television, a desktop computer system, a laptop, a tablet computer, a mobile phone, a set-top box, etc.

In some embodiments, the circuitry is configured at least to wirelessly receive using OFDM, wherein the one or more communication-related parameters include one or more of the following: a number of symbols per superframe; channel bandwidth; occupied bandwidth; sampling rate; number of resource blocks; subframe duration; frame duration; superframe duration; number of subcarriers per resource block per symbol period; nominal subcarrier spacing; nominal resource block bandwidth; FFT size; cyclic prefix size or cyclic prefix percentage; target range; carrier center frequency; user mobility requirement; modulation scheme; coding rate; signaling overhead.

Figure 10:
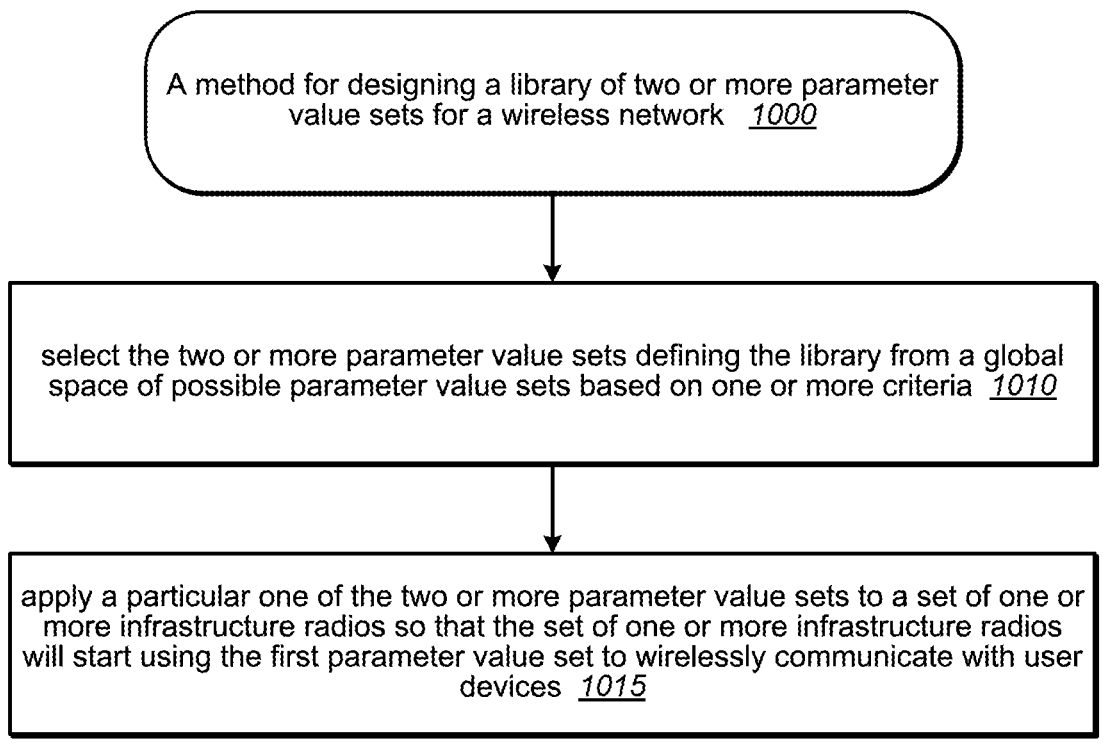
FIG. 10 illustrates one embodiment of a method for designing a library of two or more parameter value sets for a wireless network.

In one set of embodiments, a computer-implemented method 1000 for designing a library of two or more parameter value sets for a wireless network may include the operations shown in FIG. 10. (The method 1000 may also include any subset of the features, elements and embodiments described above.) The method 1000 may be performed by a computer system in response to the execution of stored program instruction. Each of the parameter value sets includes a value for each of one or more communication-related parameters (e.g., OFDM-related communication parameters).

At 1010, the computer system may select the two or more parameter value sets defining the library from a global space of possible parameter value sets based on one or more (or, two or more) criteria. The one or more communication-related parameters may include one or more of the following: a number of symbols per superframe; channel bandwidth; occupied bandwidth (or occupied signal); sampling rate; number of resource blocks; subframe duration; frame duration; superframe duration; number of subcarriers per resource block per symbol period; nominal subcarrier spacing; nominal resource block bandwidth; FFT size; cyclic prefix size (or cyclic prefix percentage); target range; carrier center frequency; user mobility requirement (e.g., in terms of maximum velocity or Doppler shift); modulation scheme; coding rate; signaling overhead.

At 1015, the computer system may apply a particular one of the two or more parameter value sets to a set of one or more infrastructure radios so that the set of one or more infrastructure radios will start using the particular parameter value set to wirelessly communicate with user devices. The particular parameter value set may be selected by an operator from the two or more parameter value sets.

In some embodiments, the one or more criteria include a requirement that the number of symbols per superframe be an integer.

In some embodiments, the one or more criteria include a requirement that subcarrier frequency spacing is greater than or equal to a minimum value determined based on a specified maximum target Doppler shift.

In some embodiments, the one or more criteria include a requirement that a guard interval is greater than or equal to a minimum value based on a specified maximum expected range of infrastructure radio transmission.

In some embodiments, one of the one or more communication-related parameters is FFT size, wherein the one or more criteria include a criterion that represents ease of implementing the FFT size.

In some embodiments, one of the one or more communication-related parameters is FFT size, wherein the FFT size is of the form $5^m 3^n 2^p$, wherein m, n and p are non-negative integers.

In some embodiments, the one of the one or more communication-related parameters is a cyclic prefix (CP) percentage.

In some embodiments, the CP percentage is computed in increasing order up to a specified maximum viable CP percentage.

In some embodiments, the method 1000 also includes receiving user input from an operator, wherein the user input defines the one or more criteria (e.g., operating objectives that govern said selecting).

In some embodiments, the method 1000 also includes storing the two or more selected parameter values sets in a memory.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable medium having instructions stored thereon that are executable by a computing device to perform operations comprising:
    displaying a first parameter configuration interface for a first parameter value set usable to determine subcarrier spacing and cyclic prefix size for wireless broadcast transmissions;
    receiving user input adjusting one or more parameters of the first parameter value set;
    displaying adjustments to one or more broadcast characteristics based on the adjusted one or more parameters of the first parameter value set;
    storing the first parameter value set, including the adjusted one or more parameters, as a parameter value set for a first target radio environment;
    displaying a second parameter configuration interface for a second parameter value set, wherein the second parameter value set includes a second signal bandwidth;
    receiving user input adjusting one or more parameters of the second parameter value set; and
    storing the second parameter value set, including the adjusted one or more parameters, as a parameter value set for a second target radio environment, wherein the second target radio environment has one or both of a different level of mobility of receiver devices and a different target distance of wireless transmission than the first target radio environment.

2. The non-transitory computer-readable medium of claim 1,
wherein the first parameter value set includes one or both of a first signal bandwidth and a first signal duration, and
wherein the second parameter value set includes one or both of a second signal bandwidth and a second signal duration.

3. The non-transitory computer-readable medium of claim 2, wherein the control panel is configured to receive input of system parameters and the operators panel is configured to receive input of performance objectives.

4. The non-transitory computer-readable medium of claim 1, wherein the first parameter configuration interface enforces one or more relationships between parameters in the first parameter value set.

5. The non-transitory computer-readable medium of claim 1, wherein the first parameter configuration interface provides a set of possible values for a first parameter for user selection.

6. The non-transitory computer-readable medium of claim 1, wherein the first parameter configuration interface provides determined values for delta-f and Doppler as a function of inputs to the first parameter configuration interface.

7. The non-transitory computer-readable medium of claim 1, wherein the first parameter configuration interface provides possible values for one or more parameters to achieve an integer number of symbols per frame.

8. The non-transitory computer-readable medium of claim 1, wherein the first parameter configuration interface provides coverage range for multiple combinations of cyclic prefix percentage.

9. The non-transitory computer-readable medium of claim 1, wherein the first parameter configuration interface provides symbol duration for multiple combinations of cyclic prefix percentage.

10. A method, comprising:
displaying, by a computing device, a first parameter configuration interface for a first parameter value set usable to determine subcarrier spacing and cyclic prefix size for wireless broadcast transmissions;
receiving, by the computing device, user input adjusting one or more parameters of the first parameter value set;
displaying, by the computing device, adjustments to one or more broadcast characteristics based on the adjusted one or more parameters of the first parameter value set;
storing, by the computing device, the first parameter value set, including the adjusted one or more parameters, as a parameter value set for a first target radio environment;
displaying, by the computing device, a second parameter configuration interface for a second parameter value set;
receiving, by the computing device, user input adjusting one or more parameters of the second parameter value set; and
storing, by the computing device, the second parameter value set, including the adjusted one or more parameters, as a parameter value set for a second target radio environment, wherein the second target radio environment has a different level of mobility of receiver devices and a different target distance of wireless transmission than the first target radio environment.

11. The method of claim 10,
wherein the first parameter value set includes one or both of a first signal bandwidth and a first signal duration, and
wherein the second parameter value set includes one or both of a second signal bandwidth and a second signal duration.

12. The method of claim 10, further comprising enforcing one or more one or more relationships between parameters in the first parameter value set.

13. The method of claim 10, wherein the first parameter configuration interface provides a set of possible values for a first parameter for user selection.

14. The method of claim 10, wherein the first parameter configuration interface provides coverage range for multiple combinations of cyclic prefix percentage.

15. A system, comprising:
one or more processors; and
one or more storage elements having instructions stored thereon that are executable by the one or more processors to:
display a first parameter configuration interface for a first parameter value set usable to determine subcarrier spacing and cyclic prefix size for wireless broadcast transmissions;
receive user input adjusting one or more parameters of the first parameter value set;
display adjustments to one or more broadcast characteristics based on the adjusted one or more parameters of the first parameter value set;
store the first parameter value set, including the adjusted one or more parameters, as a parameter value set for a first target radio environment;
display a second parameter configuration interface for a second parameter value set;
receive user input adjusting one or more parameters of the second parameter value set; and
store the second parameter value set, including the adjusted one or more parameters, as a parameter value set for a second target radio environment, wherein the second target radio environment has a different level of mobility of receiver devices and a different target distance of wireless transmission than the first target radio environment.

16. The system of claim 15,
wherein the first parameter value set includes one or both of a first signal bandwidth and a first signal duration, and
wherein the second parameter value set includes one or both of a second signal bandwidth and a second signal duration.

17. The system of claim 15, wherein the first parameter configuration interface enforces one or more relationships between parameters in the first parameter value set.

18. The system of claim 15, wherein the first parameter configuration interface provides a set of possible values for a first parameter for user selection.

19. The system of claim 15, wherein the first parameter configuration interface provides determined values for delta-f and Doppler as a function of inputs to the first parameter configuration interface.

20. The system of claim 15, wherein the first parameter configuration interface provides symbol duration for multiple combinations of cyclic prefix percentage.

* * * * *